US011359087B2

(12) United States Patent
Nakamura et al.

(10) Patent No.: US 11,359,087 B2
(45) Date of Patent: Jun. 14, 2022

(54) STRUCTURE COMPRISING LOW-RESILIENCE ELASTIC MEMBER AND HIGH-RESILIENCE ELASTIC MEMBER

(71) Applicant: KURARAY PLASTICS CO., LTD., Osaka (JP)

(72) Inventors: Yoshinori Nakamura, Osaka (JP); Teruo Kitamura, Osaka (JP); Yukio Nosaka, Osaka (JP)

(73) Assignee: KURARAY PLASTICS CO., LTD., Osaka (JP)

( * ) Notice: Subject to any disclaimer, the term of this patent is extended or adjusted under 35 U.S.C. 154(b) by 318 days.

(21) Appl. No.: 16/494,813

(22) PCT Filed: Mar. 28, 2018

(86) PCT No.: PCT/JP2018/012818
§ 371 (c)(1),
(2) Date: Sep. 17, 2019

(87) PCT Pub. No.: WO2018/181501
PCT Pub. Date: Oct. 4, 2018

(65) Prior Publication Data
US 2020/0079952 A1 Mar. 12, 2020

(30) Foreign Application Priority Data
Mar. 30, 2017 (JP) .............................. JP2017-066864

(51) Int. Cl.
| C08L 53/02 | (2006.01) |
| B32B 27/32 | (2006.01) |
| C08L 23/10 | (2006.01) |

(52) U.S. Cl.
CPC ............... *C08L 53/02* (2013.01); *B32B 27/32* (2013.01); *B32B 2274/00* (2013.01); *B32B 2437/00* (2013.01); *C08L 23/10* (2013.01); *C08L 2205/02* (2013.01)

(58) Field of Classification Search
CPC ...... C08L 53/02; C08L 23/10; C08L 2205/02; B32B 2274/00; B32B 2437/00
USPC ........................................................ 524/502
See application file for complete search history.

(56) References Cited

U.S. PATENT DOCUMENTS

| 6,096,435 | A | 8/2000 | Maekawa et al. |
| 6,872,768 | B1 | 3/2005 | Tasaka et al. |
| 2006/0041068 | A1 | 2/2006 | Ohno et al. |
| 2009/0247688 | A1 | 10/2009 | Jogo et al. |
| 2014/0045401 | A1 | 2/2014 | Kunihiro et al. |
| 2018/0030194 | A1 | 2/2018 | Uehara et al. |
| 2020/0079890 | A1 | 3/2020 | Uehara et al. |

FOREIGN PATENT DOCUMENTS

| CN | 1610531 A | 4/2005 |
| CN | 101418453 A | 4/2009 |
| EP | 0 863 184 A1 | 9/1998 |
| EP | 1 203 790 A1 | 5/2002 |
| EP | 2 009 055 A1 | 12/2008 |
| JP | 2000-328305 A | 11/2000 |
| JP | 2002-96426 A | 4/2002 |
| JP | 2002096426 A * | 4/2002 |
| JP | 2005-152134 A | 6/2005 |
| JP | 2006-83364 A | 3/2006 |
| JP | 2011-80021 A | 4/2011 |
| JP | 2012-161394 A | 8/2012 |
| JP | 2012-187857 | 10/2012 |
| JP | 2013-96025 A | 5/2013 |
| JP | 2015-161054 A | 9/2015 |
| JP | 2016-60758 A | 4/2016 |
| JP | 2016-88971 A | 5/2016 |
| JP | 2018-16932 A | 2/2018 |
| WO | WO 2012/125344 A1 | 9/2012 |
| WO | WO 2016/125899 A1 | 8/2016 |

OTHER PUBLICATIONS

International Search Report dated Jun. 12, 2018 in PCT/JP2018/012818 filed on Mar. 28, 2018.
English translation of the International Preliminary Report on Patentability dated Oct. 10, 2019 in PCT/JP2018/012818 filed Mar. 28, 2018, 7 pages.
Extended European Search Report dated Aug. 17, 2020 in European Patent Application No. 18775623.4, 7 pages.
Combined Chinese Office Action and Search Report dated Sep. 13, 2021 in Chinese Patent Application No. 201880022360.8 (with unedited computer generated English translation), 19 pages.
"Thermoplastic Elastomer", edited by Guantai Jin et al., Published by Chemical Industrial Press, Jun. 1983 (with English translation), pp. 527-529 (10 total pages).
"Dictionary of Modern Package Terms", edited by Ye Wang et al., Published by Jilin Science & Technology Publishing House, Dec. 1994 (with English translation), 5 total pages.
Frank Philip Bowden, et al., "An Introduction to Tribology", Published by China Machine Press, Feb. 1982, w/partial English translation.

* cited by examiner

*Primary Examiner* — Hui H Chin
(74) *Attorney, Agent, or Firm* — Oblon, McClelland, Maier & Neustadt, L.L.P.

(57) ABSTRACT

A structure comprising: a low-resilience elastic member 1 made of a thermoplastic elastomer (X); and a high-resilience elastic member 2 made of a thermoplastic elastomer (Y), wherein the thermoplastic elastomers (X) and (Y) are made of a resin composition including structural units derived from a vinyl aromatic compound and a conjugated diene compound, a softener, and a polyolefin resin.

8 Claims, 5 Drawing Sheets

STRUCTURE COMPRISING LOW-RESILIENCE ELASTIC MEMBER AND HIGH-RESILIENCE ELASTIC MEMBER

TECHNICAL FIELD

This patent application claims priority under the Paris Convention based on Japanese Patent Application No. 2017-066864 (filed Mar. 30, 2017) which is incorporated herein by reference in their entirety.

The present invention relates to a structure comprising a low-resilience elastic member and a high-resilience elastic member and, more particularly, to a structure suitably used as clothes, sporting goods, etc.

BACKGROUND ART

Conventionally known structures having low-resilience elastic members and high-resilience elastic members comprise a bag (Patent Document 1) and a mattress (Patent Document 2) each having a layer of a low-resilience elastic material and a layer of a high-resilience elastic material. The known structures also comprise a laminated sheet (Patent Document 3) and clothes (Patent Documents 4 to 6) each made up of a laminated body of an elastomer film and a non-woven fabric and having a less stretchable laminated part and a highly stretchable laminated part.

However, it was difficult for polyurethanes used for the low-resilience elastic members and the high-resilience elastic members described in Patent Documents 1 and 2 to provide a structure giving a soft wearing feeling while making a body motion extremely smooth during exercise and a wearer less tired at the same time. It was also difficult for polyesters and polyamides used for the highly stretchable members and the less stretchable members described in Patent Documents 3 to 6 to provide the structure as described above.

PRIOR ART DOCUMENTS

Patent Documents

Patent Document 1: Japanese Laid-Open Patent Publication No. 2005-152134
Patent Document 2: Japanese Laid-Open Patent Publication No. 2012-161394
Patent Document 3: Japanese Laid-Open Patent Publication No. 2012-187857
Patent Document 4: Japanese Laid-Open Patent Publication No. 2015-161054
Patent Document 5: Japanese Laid-Open Patent Publication No. 2013-96025
Patent Document 6: Japanese Laid-Open Patent Publication No. 2000-328305

SUMMARY OF THE INVENTION

Problem to be Solved by the Invention

An object of the present invention is to provide a structure obtained by further improving a performance of a conventional structure having a low-resilience elastic member and a high-resilience elastic member and, particularly, a structure giving a soft wearing feeling while making a body motion extremely smooth during exercise and a wearer less tired at the same time.

Means for Solving Problem

As a result of intensive studies for achieving the object, the present inventors found the effectiveness of using a low-resilience elastic member and a high-resilience elastic member respectively composed of two types of elastomer compositions having specific properties in structures such as clothes, supporters, socks, footwear, etc., thereby completing the present invention.

Specifically, the present invention provides the following preferred aspects.

[1] A structure comprising: one or more low-resilience elastic members 1 made of a thermoplastic elastomer (X); and one or more high-resilience elastic members 2 made of a thermoplastic elastomer (Y), wherein the thermoplastic elastomer (X) and the thermoplastic elastomer (Y) are each independently made of a resin composition containing (a) 100 parts by mass of a hydrogenated block copolymer having a weight average molecular weight of 200,000 or less for 50 to 100 mass % and formed by hydrogenating a block copolymer composed of at least two polymer blocks A made up of structural units derived from a vinyl aromatic compound and at least one polymer block B made up of structural units derived from a conjugated diene compound, (b) 50 to 300 parts by mass of a hydrocarbon softener, and (c) 3 to 50 parts by mass of a polyolefin resin relative to a total of 100 parts by mass of (a) and (b), wherein the thermoplastic elastomer (X) has a modulus of 1.0 MPa or less at elongation of 100% and a hysteresis loss rate of 70% or more, and wherein the thermoplastic elastomer (Y) has a modulus of 1.0 MPa or less at elongation of 100% and a hysteresis loss rate of 40% or less.

[2] The structure according to [1], wherein the one or more low-resilience elastic members 1 and the one or more high-resilience elastic members 2 are joined continuously or at predetermined positions on cloth.

[3] The structure according to [2], wherein the low-resilience elastic members 1 and the high-resilience elastic members 2 are alternately joined.

[4] The structure according to [2], wherein the low-resilience elastic members 1, the high-resilience elastic members 2, and the cloth are regularly or randomly joined.

[5] The structure according to any of [1] to [4], wherein the low-resilience elastic member 1 and the high-resilience elastic member 2 form a multi-layer structure in which the members are laminated on cloth or laminated each other.

[6] The structure according to any of [1] to [5], wherein the low-resilience elastic member 1 and the high-resilience elastic member 2 are laminated on cloth by bonding the members entirely or at points.

[7] The structure according to any of [1] to [6], wherein the low-resilience elastic member 1 and the high-resilience elastic member 2 are each independently a film, a sheet, a tape, a woven fabric, a knitted fabric, a non-woven fabric, or a mesh body.

[8] The structure according to any of [1] to [7], wherein the structure is clothes, a supporter, a sock, or footwear.

Effect of the Invention

The structure according to the present invention is obtained by further improving a performance of a conventional structure having a low-resilience elastic member and a high-resilience elastic member and, particularly when used for clothes etc., the structure provides the effect of giving a soft wearing feeling while making a body motion extremely smooth during exercise and a wearer less tired at the same time. Additionally, by arranging the low-resilience elastic member at a position where motion is desirably suppressed and the high-resilience elastic member at a position where motion is desirably facilitated, the effect can further excellently be exerted.

MODES FOR CARRYING OUT THE INVENTION

Figure 1:
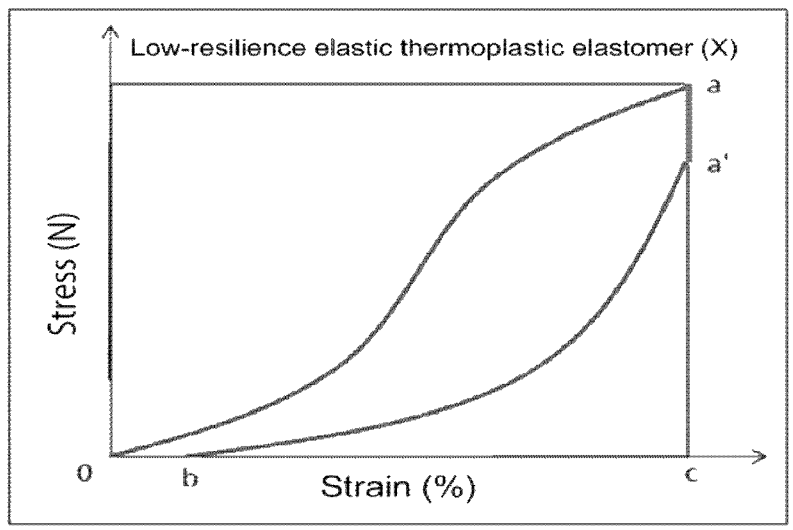
FIG. 1 is a diagram schematically showing an S-S curve of a low-resilience elastic thermoplastic elastomer (X) in the present invention.

In the present invention, a thermoplastic elastomer (X) and a thermoplastic elastomer (Y) respectively constituting a low-resilience elastic member 1 and a low-resilience elastic member 2 are each independently made of a resin composition containing (a) 100 parts by mass of a hydrogenated block copolymer having a weight average molecular weight of 200,000 or less for 50 to 100 mass % and formed by hydrogenating a block copolymer composed of at least two polymer blocks A made up of structural units derived from a vinyl aromatic compound and at least one polymer block B made up of structural units derived from a conjugated diene compound, (b) 50 to 300 parts by mass of a hydrocarbon softener, and (C) 3 to 50 parts by mass of a polyolefin resin relative to a total of 100 parts by mass of (a) and (b).

<Block Copolymer (a)>

The block copolymer (a) is a hydrogenated block copolymer obtained by hydrogenating a block copolymer formed by hydrogenating a block copolymer composed of at least two polymer blocks A made up of structural units derived from a vinyl aromatic compound and at least one polymer block B made up of structural units derived from at least one conjugated diene compound.

Examples of the vinyl aromatic compound comprise styrene, α-methylstyrene, o-methylstyrene, m-methylstyrene, p-methylstyrene, 1,3-dimethyl styrene, vinyl naphthalene, vinyl anthracene, etc. Among them, styrene and α-methylstyrene are preferable. One of the aromatic vinyl compounds may be used alone, or two or more thereof may be used together.

The content of the vinyl aromatic compound in the block copolymer (a) is preferably 5 to 75 mass %, more preferably 5 to 50 mass %.

Examples of the conjugated diene compound comprise butadiene, isoprene, 2,3-dimethyl-1,3-butadiene, 1,3-pentadiene, 1,3-hexadiene, etc. One of the conjugated diene compounds may be used alone, or two or more thereof may be used together. Among them, the conjugated diene compound is preferably at least one selected from isoprene and butadiene and more preferably a mixture of isoprene and butadiene.

In the block copolymer (a), 50% or more of carbon-carbon double bonds derived from the conjugated diene compound of the polymer block B is preferably hydrogenated, 75% or more thereof is more preferably hydrogenated, and 95% or more thereof is particularly preferably hydrogenated.

The block copolymer (a) may contain at least one each of the polymer block A and the polymer block B; however, from the viewpoint of heat resistance, mechanical characteristics, etc., the block copolymer (a) preferably contains two or more polymer blocks A and one or more polymer blocks B. A binding mode of the polymer block A and the polymer block B may be linear, branched, or any combination thereof, and when the polymer block A is denoted by A and the polymer block B is denoted by B, examples thereof can comprise a triblock structure represented by A-B-A and multiblock structures represented by (A-B)n and (A-B)n-A (where n represents an integer of 2 or more). Among them, the triblock structure represented by A-B-A is particularly preferable in terms of heat resistance, mechanical characteristics, handleability, etc.

The weight average molecular weight of the block copolymer (a) is preferably in a range of 40,000 to 500,000 from the viewpoint of molding processability and mechanical properties.

It is necessary that 50 to 100 mass % of the block copolymer (a) has a weight average molecular weight of 200,000 or less so as to obtain desired resilience elasticity and high-resilience elasticity. If the block copolymer (a) having a weight average molecular weight of 200,000 or less is less than 50 mass %, desired resilience elasticity and high-resilience elasticity cannot be obtained. Particularly, 80 to 100 mass % of the block copolymer (a) preferably has a weight average molecular weight of 200,000 or less. In an example of a method for obtaining the block copolymer (a) with a specific content having a weight average molecular weight of 200,000 or less, for example, the block copolymer (a) may be obtained by blending two or more types, preferably two to three types, or more preferably two types of block copolymers respectively having a weight average molecular weight of 20,000 or more and 200,000 or less and a weight average molecular weight greater than 20,000 and equal to or less than 500,000 in a predetermined range of ratio, for example, at a ratio of 50 to 100 mass %/50 to 0 mass %.

The weight average molecular weight as used herein means the weight average molecular weight in terms of polystyrene obtained by gel permeation chromatography (GPC) measurement under the following measurement conditions, for example.

Measurement Conditions

GPC: LC Solution (manufactured by SHIMADZU)

Detector: Differential Refractometer RID-10A (manufactured by SHIMADZU)

Column: Two TSKgel G4000Hxl in series (manufactured by TOSOH)

Guard column: TSK guard column Hxl-L (manufactured by TOSOH)

Solvent: tetrahydrofuran

Temperature: 40° C.

Flow rate: 1 ml/minute

Concentration: 2 mg/ml

<Hydrocarbon Softener (b)>

Examples of the hydrocarbon softeners (b) comprise hydrocarbon rubber softeners such as process oils, such as paraffinic oil, naphthenic oil, and aromatic oil, and liquid paraffin, and among them, process oils such as paraffin oil and naphthene oil are preferable. One of them can be used alone, or two or more can be used together.

When the thermoplastic elastomer (X) and the thermoplastic elastomer (Y) each independently contain 50 to 300 parts by mass of the hydrocarbon softener (b) relative to 100 parts by mass of the block copolymer (a), desired resilience elasticity and high-resilience elasticity can be obtained. The content is preferably 60 to 200 parts by mass, more preferably 60 to 150 parts by mass.

<Polyolefin Resin (c)>

Examples of the polyolefin resin (c) comprise propylene polymers and ethylene polymers. For the propylene polymers, for example, homopolypropylene, random polypropylene, block polypropylene, atactic polypropylene, and syndiotactic polypropylene are usable. Among them, random polypropylene and block polypropylene are preferably used. For the ethylene polymers, for example, one type or two or more types of polymers are usable out of ethylene homopolymers such as medium-density polyethylene, low-density polyethylene (LDPE), and high-density polyethylene (HDPE); and ethylene/α-olefin copolymers such as ethylene/1-butene copolymer, ethylene/1-hexene copolymer, ethylene/1-heptene copolymer, ethylene/1-octene copolymer, ethylene/4-methyl-1-pentene copolymer, ethylene/1-nonene copolymer, and ethylene/1-decene copolymer.

When the thermoplastic elastomer (X) and the thermoplastic elastomer (Y) are each independently contain 3 to 50 parts by mass of the polyolefin resin (c) relative to a total of 100 parts by mass of the components (a) and (b), desired low-resilience elastic and high-resilience elastic coefficients can be obtained. The content is preferably 5 to 20 parts by mass relative to a total of 100 parts by mass of the components (a) and (b).

By independently using a resin composition containing (a), (b), and (c) described above for each of the thermoplastic elastomers, i.e., the thermoplastic elastomer (X) and the thermoplastic elastomer (Y), desired resilience elasticity and high-resilience elasticity can be obtained. Furthermore, the low-resilience elastic member 1 made of the thermoplastic elastomer (X) stretches well with low stress as compared to conventional polyurethane elastomers etc. and, for example, stretches with extremely low stress to the elongation of 500% before a subsequent sudden rise and returns slowly after releasing the stress, so that when used for clothes etc., the elastomer provides the effect of giving a soft wearing feeling while making a body motion extremely smooth during exercise and a wearer less tired. Additionally, by arranging the low-resilience elastic member at a position where motion is desirably suppressed and the high-resilience elastic member at a position where motion is desirably facilitated, the effect can further excellently be exerted.

The thermoplastic elastomer (X) constituting the low-resilience elastic member 1 has a modulus of 1.0 MPa or less at the elongation of 100% and a hysteresis loss rate of 70% or more, and the thermoplastic elastomer (Y) constituting the high-resilience elastic member 2 has a modulus of 1.0 MPa or less at the elongation of 100% and a hysteresis loss rate of 40% or less.

The thermoplastic elastomers (X) and (Y) are each independently selected from a range of the resin compositions containing (a), (b), and (c). To obtain the thermoplastic elastomer (X) constituting the low-resilience elastic member 1 satisfying the conditions described above (hereinafter, also referred to as a low-resilience elastic thermoplastic elastomer (X)), for example, the thermoplastic elastomer can suitably be obtained by using, as the block copolymer (a), a hydrogenated block copolymer of a styrene-isoprene-styrene type triblock copolymer (styrene content: 15 to 30 mass %; weight average molecular weight: 50000 to 170000, content of 3,4-bond units and 1,2-bond units of structural units derived from isoprene and/or butadiene: 50 to 75%). To obtain the thermoplastic elastomer (Y) constituting the high-resilience elastic member 2 satisfying the conditions described above (hereinafter, also referred to as a high-resilience elastic thermoplastic elastomer (Y)), for example, the thermoplastic elastomer can suitably be obtained by using, as the block copolymer (a), a hydrogenated block copolymer of a styrene-isoprene/butadiene-styrene type triblock copolymer (styrene content: 20 to 40 mass %; weight average molecular weight: 50000 to 170000; content of 3,4-bond units and 1,2-bond units of structural units derived from isoprene and/or butadiene: 5 to 40%).

It is important that the low-resilience elastic thermoplastic elastomer (X) has the modulus of 1.0 MPa or less at the elongation of 100%, and the modulus is preferably 0.5 to 0.9 MPa, further preferably 0.6 to 0.9 MPa. It is important that the high-resilience elastic thermoplastic elastomer (Y) has the modulus of 1.0 MPa or less at the elongation of 100%, and the modulus is preferably 0.4 to 0.8 MPa, further preferably 0.5 to 0.8 MPa.

It is important that the low-resilience elastic thermoplastic elastomer (X) has the hysteresis loss rate of 70% or more, and the hysteresis loss rate is preferably 71% or more, more preferably 72% or more. The preferred upper limit is 90%. It is important that the high-resilience elastic thermoplastic elastomer (Y) has the hysteresis loss rate of 40% or less, and the hysteresis loss rate is preferably 38% or less, more preferably 35% or less. The preferred lower limit is 25%. When both the thermoplastic elastomer (X) and the thermoplastic elastomer (Y) satisfy these conditions, the object of the present invention, i.e., the improved structure, can be achieved.

A method of measuring the hysteresis loss rate will be described in examples.

Although the reason is uncertain, when the low-resilience elastic thermoplastic elastomer (X) and the high-resilience elastic thermoplastic elastomer (Y) each satisfy the specific modulus and the hysteresis loss and are the specific resin compositions (thermoplastic elastomer compositions) as described above, the object of the present invention, i.e., a structure such as clothes giving a soft wearing feeling while making a body motion extremely smooth during exercise and a wearer less tired at the same time, can be achieved. If the conditions are not satisfied, it is difficult to achieve the object of the present invention, which is sufficiently supported by comparative examples described later.

In the present invention, at least one or both of the thermoplastic elastomer (X) resin composition and the thermoplastic elastomer (Y) resin composition may further contain a variety of antiblocking agents, heat stabilizers, antioxidants, light stabilizers, ultraviolet light absorbers, lubricants, crystal nucleating agents, foaming agents, colorants, etc. depending on the need or application. Examples of the antioxidants comprise phenolic antioxidants, phosphite antioxidants, and thioether antioxidants such as 2,6-di-tert-butyl-p-cresol, 2,6-di-tert-butylphenol, 2,4-dimethyl-6-tert-butylphenol, 4,4'-dihydroxydiphenyl, tris(2-methyl-4-hydroxy-5-tert-butylphenyl)butane, tetrakis[methylene-3-(3,5-di-tert-butyl-4-hydroxyphenyl)propionate]methane, and 3,9-bis{2-[3-(3-tert-butyl-4-hydroxy-5-methylphenyl)propionyloxy]-1,1-dimethylethyl}-2,4,8,10-tetraoxaspiro-5,5-undecane. Among them, phenolic antioxidants and phosphite antioxidants are particularly preferable. Regarding the antioxidant that may be contained in each of the resin compositions, the content is preferably 0.01 to 3.0 mass %, more preferably 0.05 to 1.0 mass %, relative to a total of 100 parts by mass of the components (a) to (c) contained in the resin composition.

For a method of manufacturing the thermoplastic elastomer (X) and the thermoplastic elastomer (Y), a method used for manufacturing a general resin composition or manufacturing a rubber composition is usable. The components can uniformly be compounded (melt-kneaded) by using a melt kneader (a processing machine) such as a single-screw extruder, a twin-screw extruder, a mixing roll, a Banbury mixer, a heating roll, a pressurizing kneader, and various kneaders, and the obtained resin composition can be pelletized. A set temperature of the processing machine can arbitrarily be selected from, for example, 150° C. to 300° C. depending on a type of resin, and the manufacturing method has no limitation. The obtained pellet-shaped resin composition can be formed into a desired form such as a film and a sheet by using a processing machine, for example, a heat press roll, a hot press machine, an injection molding machine, an insert injection machine, a sheet molding machine, a coextrusion sheet molding machine, an extrusion lamination molding machine, or a calender roll molding machine.

From a melt-kneaded material (or pellets) obtained as described above, a sheet or a porous sheet preferably having a mesh shape can be manufactured by using a known method. Examples of such a method comprise a method of extruding a melt-kneaded material on a roll having unevenness, a method of punching a melt-kneaded material extruded into a sheet shape, a method of forming a melt-kneaded material extruded in a fiber-like manner into a net-like shape or a knit-fabric shape, etc. Examples of the method of obtaining a sheet by a punching method comprise a method in which a film or a sheet of the resin composition is prepared for obtaining a mesh-shaped porous sheet by various punching methods, and a method in which a woven or non-woven fabric made of the resin composition is used for obtaining a mesh-shaped porous sheet by various punching methods. Among them, a sheet obtained by a punching method is optimum for achieving the object of the present invention.

Specific examples of the shape of the structure according to the present invention will be described with reference to FIGS. 3 to 9.

Figure 3:
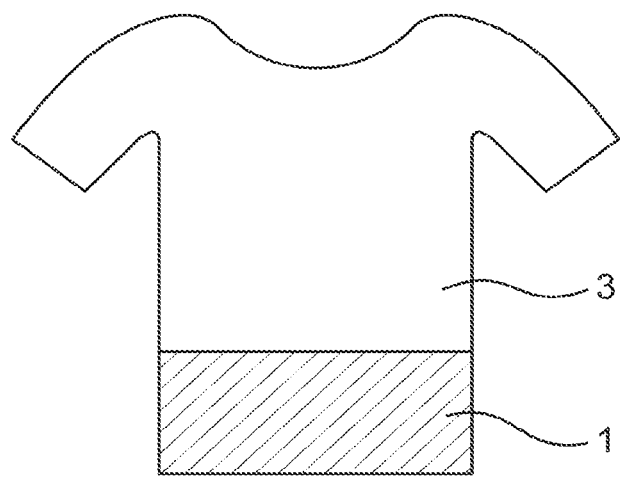
FIG. 3 is a diagram schematically showing a front view (ventral view) of sportswear that is a structure according to an embodiment of the present invention.

FIG. 3 shows a front view (ventral view) of sportswear as an embodiment of the structure according to the present invention. The low-resilience elastic member 1 (mesh body) made of the low-resilience elastic thermoplastic elastomer (X) is disposed in an abdominal portion. The low-resilience elastic member 1 is disposed by being continuously joined to normal cloth 3. In this case, the low-resilience elastic member 1 made of the low-resilience elastic thermoplastic elastomer (X) may be disposed by being joined over the normal cloth 3.

Figure 4:
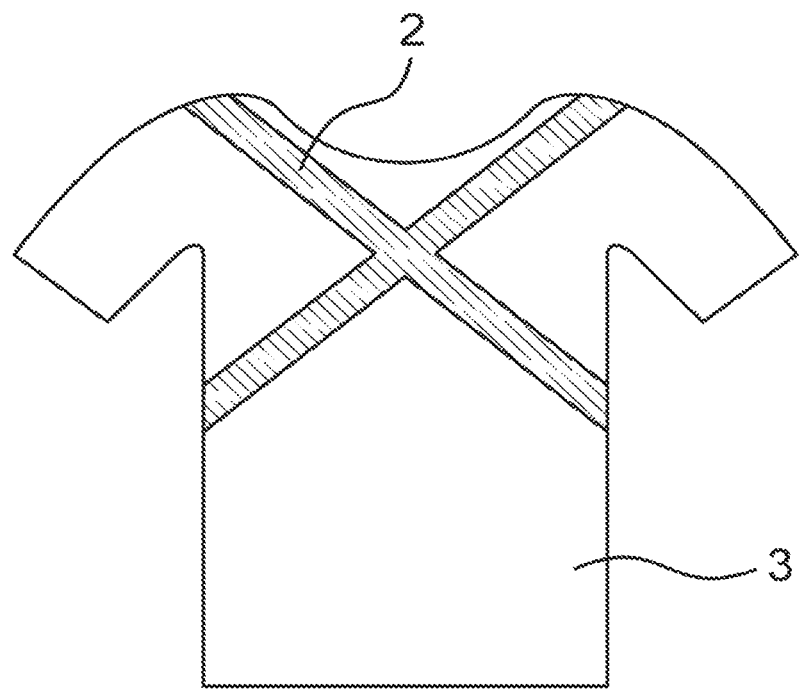
FIG. 4 is a diagram schematically showing a rear view (back view) of the sportswear of FIG. 3.

FIG. 4 shows a rear view (back view) of the sportswear of FIG. 3. The high-resilience elastic member 2 (mesh body) made of the high-resilience elastic thermoplastic elastomer (Y) is disposed in a cross shape at shoulder and arm base portions. The high-resilience elastic member 2 composed of the cross-shaped high-resilience elastic thermoplastic elastomer (Y) is disposed by being joined over the normal cloth 3.

Such a structure can decrease an impact of external force on an abdominal surface to reduce fatigue and allow the arms to move quickly on a back surface in shoulder and arm base portions so that the agility can be increased.

Figure 5:
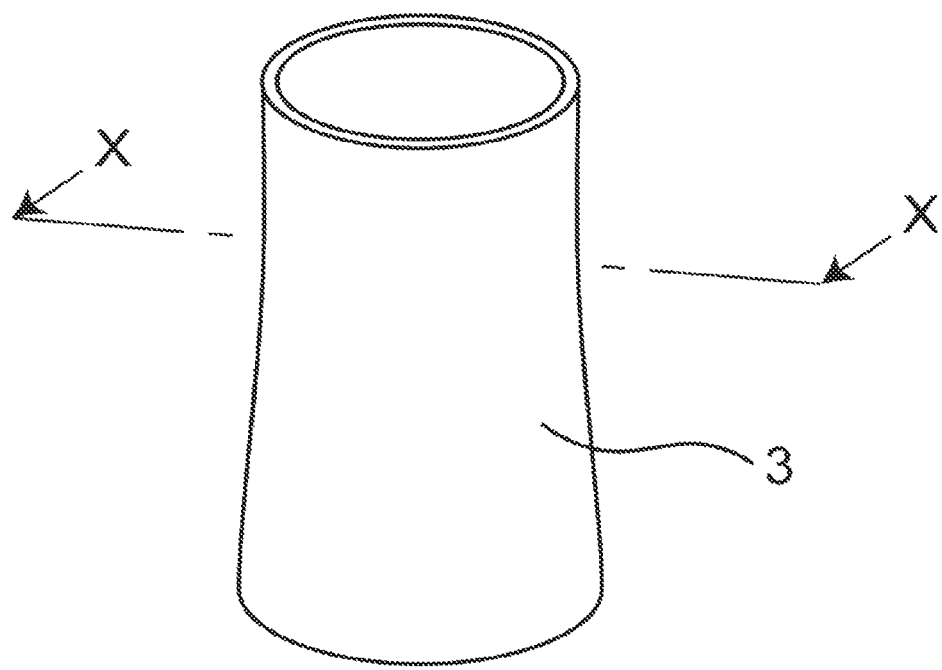
FIG. 5 is a diagram schematically showing an elbow/knee supporter that is a structure according to an embodiment of the present invention.
Figure 6:
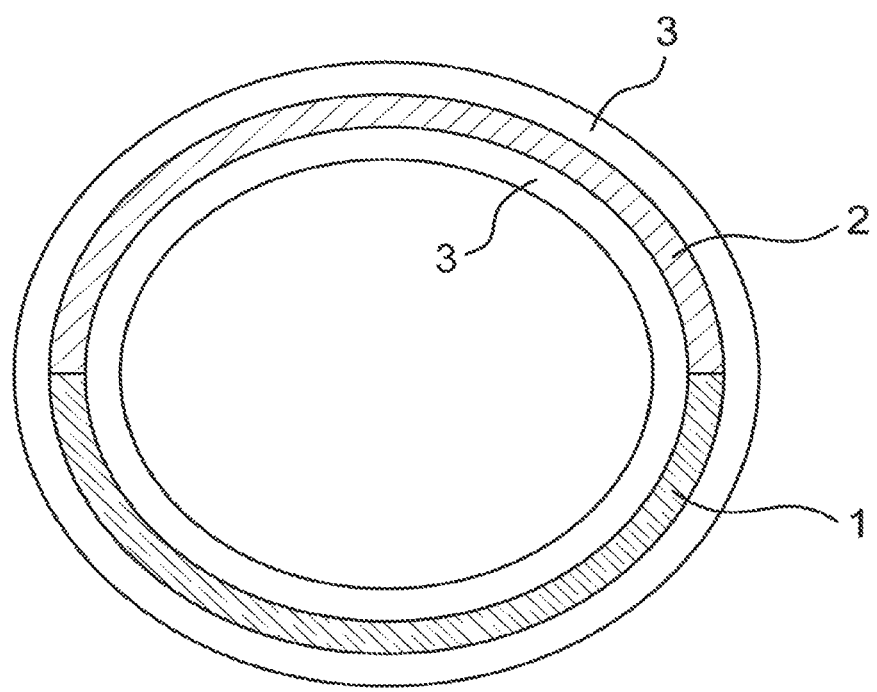
FIG. 6 is a cross-sectional view of the elbow/knee supporter of FIG. 5.

FIGS. 5 and 6 show a schematic view and a cross-sectional view, respectively, of an elbow/knee supporter as an embodiment of the structure according to the present invention. The low-resilience elastic member 1 (mesh body) made of the low-resilience elastic thermoplastic elastomer (X) and the high-resilience elastic member 2 (mesh body) made of the high-resilience elastic thermoplastic elastomer (Y) are disposed on the outside and the inside, respectively, of the elbow or knee. This embodiment shows a composite structure in which a single-layer structure of the low-resilience elastic member 1 and the high-resilience elastic member 2 joined to each other is sandwiched and disposed between two sheets of cloth.

Such a structure facilitates inward bending and quick outward bending, can make a body motion smooth during exercise, reduce stress on elbows or knees, make a wearer less tired, and increase the agility. The low-resilience elastic member 1 (mesh body) made of the low-resilience elastic thermoplastic elastomer (X) and the high-resilience elastic member 2 (mesh body) made of the high-resilience elastic thermoplastic elastomer (Y) can be disposed reversely, i.e., on the inside and the outside, respectively, of the elbow or knee.

Figure 7:
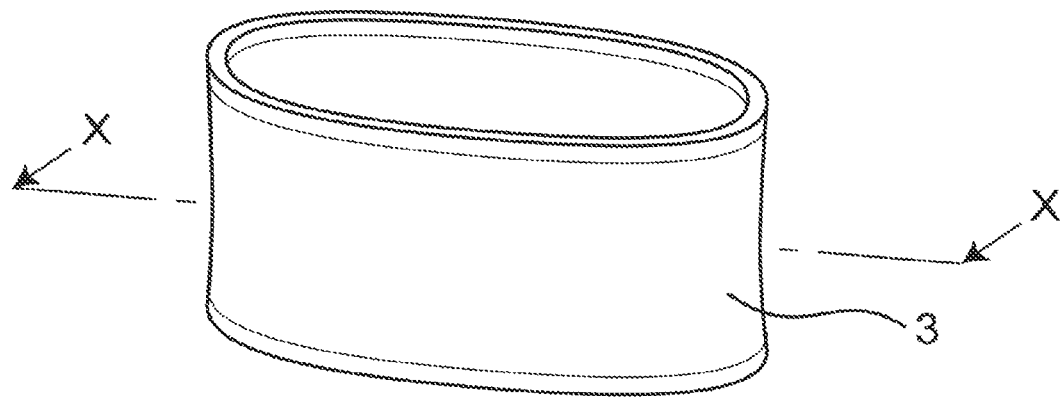
FIG. 7 is a diagram schematically showing a waist supporter that is a structure according to an embodiment of the present invention.
Figure 8:
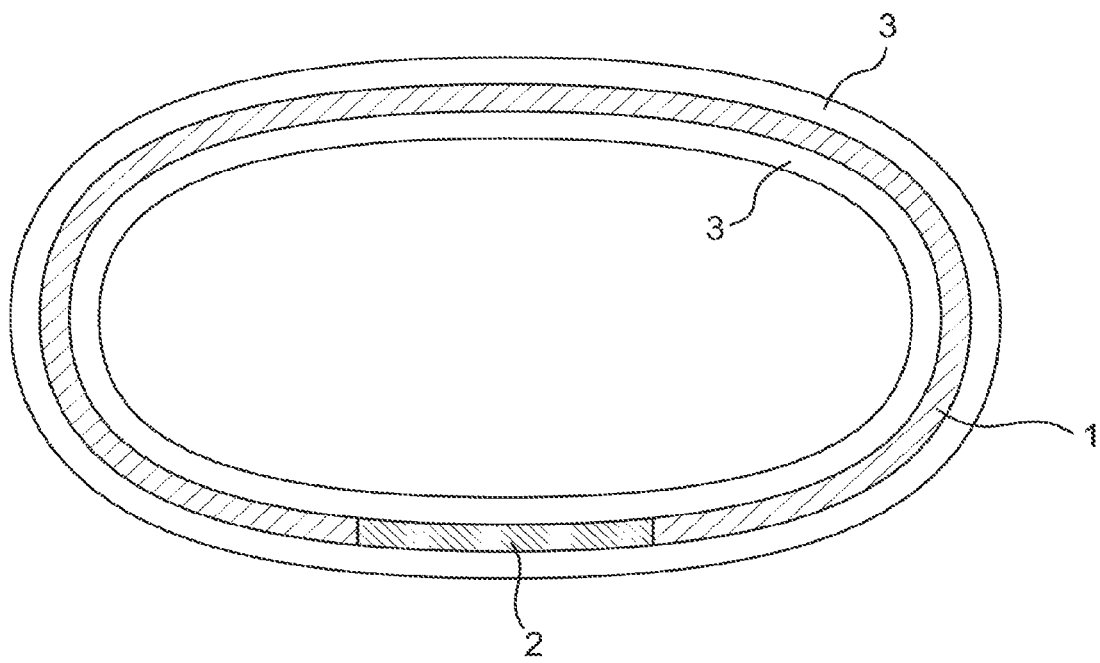
FIG. 8 is a cross-sectional view of the waist supporter of FIG. 7.

FIGS. 7 and 8 show a schematic view and a cross-sectional view, respectively, of a waist supporter as an embodiment of the structure according to the present invention. The low-resilience elastic member 1 (mesh body) made of the low-resilience elastic thermoplastic elastomer (X) is disposed on both sides (both flank portions), and the high-resilience elastic thermoplastic elastomer (Y) member 2 (mesh body) is disposed on the front and back (the front side and/or the back side, i.e., the abdominal portion and/or the back portion; in FIG. 8, only one of the front and back). This embodiment shows a composite structure in which a single-layer structure of the low-resilience elastic member 1 and the high-resilience elastic member 2 joined to each other is sandwiched and disposed between two sheets of cloth.

Such a structure fixes the motion of the body on both sides while facilitating the motion of the body on the front and back, and therefore makes a body motion extremely smooth during exercise and a wearer less tired, so that the agility can be increased.

Figure 9:
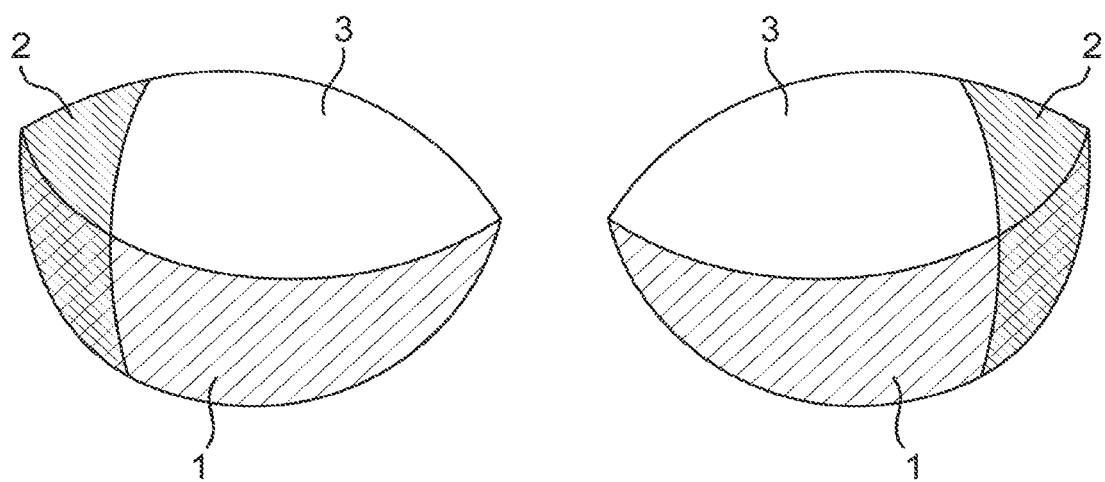
FIG. 9 is a diagram schematically showing a front view of a brassiere (or a brassiere pad) that is a structure according to an embodiment of the present invention.

FIG. 9 shows a front view of a brassiere (or a brassiere pad) as an embodiment of the structure according to the present invention. The low-resilience elastic member 1 (mesh body) made of the low-resilience elastic thermoplastic elastomer (X) and the high-resilience elastic member 2 (mesh body) made of the high-resilience elastic thermoplastic elastomer (Y) are disposed on lower portions and the outside, respectively. Upper portions are made of the normal cloth 3 and the low-resilience elastic member 1 and the high-resilience elastic member 2 are each disposed by being continuously joined to the normal cloth 3. In this case, the low-resilience elastic member 1 and/or the high-resilience elastic member 2 may be disposed by being joined over the normal cloth 3, and the low-resilience elastic member 1 and the high-resilience elastic member 2 may at least partially overlap each other.

Such a structure prevents the motion of the lower portions of the breasts, makes a force of restoration of the breasts toward the inside lager with respect to leftward and rightward motions during dancing etc., and therefore makes a body motion smooth during exercise and a wearer less tired.

The low-resilience elastic member 1 made of the low-resilience elastic thermoplastic elastomer (X) and the high-resilience elastic member 2 made of the high-resilience elastic thermoplastic elastomer (Y) may be a multi-layer structure in which the members are laminated onto cloth or laminated each other. In this case, the low-resilience elastic member 1 and the high-resilience elastic member 2 may be laminated and bonded entirely onto the cloth or between the members or may be bonded at points in places.

The low-resilience elastic member 1 made of the low-resilience elastic thermoplastic elastomer (X) and the high-resilience elastic member 2 made of the high-resilience elastic thermoplastic elastomer (Y) are suitably joined at any desired positions on the cloth depending on the application and purpose of the structure.

When the members are laminated to each other, normal cloth may be disposed in the middle of layers, or on an outer layer, of the low-resilience elastic member 1 and the high-resilience elastic member 2, and the low-resilience elastic member 1 and the high-resilience elastic member 2 may further be bonded entirely or at points to the normal cloth to form a multi-layer structure.

Examples of the single-layer or multi-layer structure of the low-resilience elastic member 1 made of the low-resilience elastic thermoplastic elastomer (X) and the high-resilience elastic member 2 made of the high-resilience elastic thermoplastic elastomer (Y) joined continuously or at predetermined positions on cloth comprise a structure in which the low-resilience elastic member 1 and the high-resilience elastic member 2 are joined continuously or at predetermined positions on cloth in an alternate manner, and a structure in which the low-resilience elastic member 1, the high-resilience elastic member 2, and the normal cloth 3 are joined continuously or at predetermined positions on cloth in a regular manner or a random manner.

These single-layer structures or multi-layer structures can be used with normal cloth laminated on one side or both sides thereof.

In the present invention, the low-resilience elastic member 1 and the high-resilience elastic member 2 may have a form of a film, a sheet, a tape, a woven fabric, a knitted fabric, a non-woven fabric, a mesh body, etc.

Representative examples of the structure comprise: clothes such as sporting clothes (jackets, shirts, tights, pants, etc.), brassieres, sports brassieres, and corsets; supporters such as sports or therapeutic supporters, elbow or knee supporters, waist supporters, wristband supporters; socks such as sports socks; and footwear such as insoles of sports shoes.

EXAMPLES

The present invention will hereinafter more specifically be described with examples; however, the present invention is not limited thereto in any way.

(Measurement of Hysteresis Loss Rate)

Pellets of thermoplastic elastomer compositions obtained in the following examples were molded at 230° C. by an injection molding machine ("FF 120", manufactured by NISSEI) to form test pieces having a disk sheet shape with a diameter of 120 mm and a thickness of 2 mm. The test pieces were punched into a dumbbell No. 3 shape and pulled at a speed of 500 mm/minute by Autograph (manufactured by Shimadzu Corporation). After being held for 60 seconds at the elongation of 500%, an S-S curve was obtained by returning the test pieces at 500 mm/minute.

Figure 2:
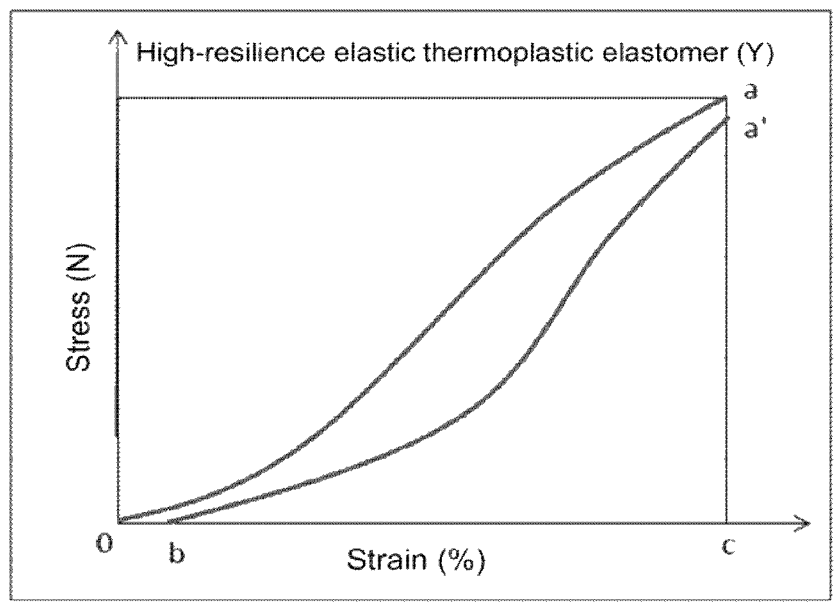
FIG. 2 is a diagram schematically showing an S-S curve of a high-resilience elastic thermoplastic elastomer (Y) in the present invention.

The hysteresis loss rate is calculated by the S-S curves (horizontal axis: elongation percentage; vertical axis: stress) shown in FIGS. 1 and 2 obtained in the manner described above.

Hysteresis loss rate (%)=area(0aa'b)/area(0ac)×100

The area (0aa'b) and the area (0ac) denote areas of figures obtained by connecting symbols 0, a, a', h, c described in FIGS. 1 and 2.

(Measurement of Modulus at Elongation of 100%)

The same dumbbell No. 3-shaped samples were pulled at a speed of 500 mm/minute by Autograph (Shimadzu Corporation) to measur stress (megapascal=MPa) at the elongation of 100%.

Examples 1 to 4 and Comparative Examples 1 to 3

The following resin composition was used as the low-resilience elastic thermoplastic elastomer (X). Specifically, components were uniformly melt-kneaded and pelletized by using a twin-screw extruder (200° C.) to obtain the resin composition.

<Block Copolymer (a)>

Component (a-1)

Type: hydrogenated block copolymer of styrene-isoprene-styrene type triblock copolymer; styrene content: 20 mass %; weight average molecular weight: 90000; content of 3,4-bond units and 1,2-bond units of structural units derived from isoprene and/or butadiene: 55%

Component (a-2)

Type: hydrogenated block copolymer of styrene-isoprene/butadiene-styrene type triblock copolymer; styrene content: 30 mass %; weight average molecular weight: 270000; content of 3,4-bond units and 1,2-bond units of structural units derived from isoprene and/or butadiene: 8%

<Hydrocarbon Softener (b)>

Component (b-1)

Diana Process Oil PW-380 (trade name), manufactured by Idemitsu Petrochemical Co., Ltd. for rubber; paraffin oil; dynamic viscosity (40° C.): 381.6 mm$^2$/s; ring analysis paraffin: 73%; ring analysis naphthene: 27%; weight average molecular weight: 1304

<Polyolefin Polymer (c)>

Component (c-1)

Polypropylene, Prime Polypro F219DA (trade name), manufactured by Prime Polymer Co. Ltd.; MFR (230° C.): 8.0 g/10 minutes The following resin composition was used as the high-resilience elastic thermoplastic elastomer (Y). The resin composition was manufactured in the same manner as the low-resilience elastic thermoplastic elastomer (X) described above.

<Block Copolymer (a)>

Component (a-2)

Type: hydrogenated block copolymer of styrene-isoprene/butadiene-styrene type triblock copolymer; styrene content:

30 mass %; weight average molecular weight: 270000; content of 3,4-bond units and 1,2-bond units of structural units derived from isoprene and/or butadiene: 8%

Component (a-3)

Type: hydrogenated block copolymer of styrene-isoprene/butadiene-styrene type triblock copolymer; styrene content: 30 mass %; weight average molecular weight: 90000; content of 3,4-bond units and 1,2-bond units of structural units derived from isoprene and/or butadiene: 8%

<Hydrocarbon Softener (b)>

Component (b-1)

Diana Process Oil PW380 (trade name), manufactured by Idemitsu Petrochemical Co., Ltd. for rubber; paraffin oil; dynamic viscosity (40° C.): 38L6 mm$^2$/s; ring analysis paraffin: 73%; ring analysis naphthene: 27%; weight average molecular weight: 1304

<Polyolefin Resin (c)>

Component (c-1)

Polypropylene, Prime Polypro F219DA (trade name), manufactured by Prime Polymer Co. Ltd.; MFR (230° C.): 8.0 g/10 minutes The 100% modulus and the hysteresis loss rate of the low-resilience elastic elastomers (X) and the high-resilience elastic elastomers (Y) obtained by the methods described above are shown in tables. Values of (X) and (Y) of comparative examples described later are also shown.

TABLE 1

|  |  |  | Example 1 | | Example 2 | | Example 3 | | Example 4 | |
| --- | --- | --- | --- | --- | --- | --- | --- | --- | --- | --- |
|  |  |  | X | Y | X | Y | X | Y | X | Y |
| composition | a-1 | parts by | 70 |  | 70 |  | 55 |  | 70 |  |
|  | a-2 | mass | 30 | 25 | 30 | 35 | 45 | 25 | 30 | 45 |
|  | a-3 |  |  | 75 |  | 65 |  | 75 |  | 55 |
|  | b-1 |  | 90 | 100 | 90 | 150 | 200 | 100 | 90 | 250 |
|  | c-1 |  | 7 | 10 | 7 | 10 | 15 | 10 | 7 | 20 |
| performance | 100% modulus | Mpa | 0.7 | 0.7 | 0.7 | 0.5 | 0.9 | 0.7 | 0.7 | 0.8 |
|  | hysteresis loss rate | % | 75 | 31 | 75 | 38 | 71 | 31 | 75 | 38 |

TABLE 2

|  |  |  | Comparative Example 1 | | Comparative Example 2 | | Comparative Example 3 | |
| --- | --- | --- | --- | --- | --- | --- | --- | --- |
|  |  |  | X | Y | X | Y | X | Y |
| composition | a-1 | parts by | 70 | TPU | 40 |  | 70 |  |
|  | a-2 | mass | 30 |  | 60 | 25 | 30 | 60 |
|  | a-3 |  |  |  |  | 75 |  | 40 |
|  | b-1 |  | 90 |  | 90 | 100 | 90 | 100 |
|  | c-1 |  | 7 |  | 7 | 10 | 7 | 10 |
| performance | 100% modulus | Mpa | 0.7 | 1.5 | 0.7 | 0.7 | 0.7 | 1.2 |
|  | hysteresis loss rate | % | 75 | 37 | 55 | 31 | 75 | 45 |

Examples 5 to 8

The thermoplastic elastomers (X) obtained in Examples 1 to 4 were used for obtaining mesh bodies (porosity: 40%), and the thermoplastic elastomers (Y) obtained as described above were used for obtaining mesh bodies (porosity: 40%). These mesh bodies are obtained by melt-kneading of each of the resin compositions (pellets) serving as the low-resilience elastic thermoplastic elastomers (X) and the resin compositions (pellets) serving as the high-resilience elastic thermoplastic elastomers (Y), extrusion into a sheet shape, and punching.

Measurement of Porosity

After a 10 cm×10 cm porous sheet was copied to A4 size at the magnification of 400% by using a copier (IPSio0 SP6310 RPCS type manufactured by Ricoh Co., Ltd.) to measure a weight (W1 [g]) of the copy sheet with the portion other than the he porous sheet removed, all the portions corresponding to opening portions of the copy sheet were cut out to measure a weight (W2 [g]) of the copy sheet after the cutting-out, and the porosity (%) was calculated according to the following equation:

$$\text{Porosity (\%)} = [(W1-W2)/W1] \times 100.$$

Sports shirts having the structure shown in FIGS. 3 to 4 were fabricated by using these mesh bodies and normal polyester fabric (2WAY tricot). The obtained sports shirts were comfortable since the shirts gave a soft wearing feeling while making a body motion extremely smooth during exercise.

Examples 9 to 12

Elbow/knee supporters having the structure shown in FIGS. 5 and 6 were fabricated by using the thermoplastic elastomers (X) and the thennoplastic elastomers (Y) obtained in Examples 1 to 4. The elbow/knee supporter were comfortable since the supporter facilitated inward bending and quick outward bending and made a body motion smooth during exercise.

Examples 13 to 16

Waist supporters having the structure shown in FIGS. 7 and 8 were fabricated by using the thermoplastic elastomers (X) and the thermoplastic elastomers (Y) obtained in Examples 1 to 4. The waist supporters were comfortable since the supporters fixed the motion of the body on both sides while facilitating the motion of the body on the front and back and therefore made a body motion extremely smooth during exercise.

Examples 17 to 20

Brassieres having the structure shown in FIG. 9 were fabricated by using the thermoplastic elastomers (X) and the thermoplastic elastomers (Y) obtained in Examples 1 to 4. The brassieres were comfortable since the brassieres prevented the motion of the lower portions of the breasts, made a force of restoration of the breasts toward the inside lager with respect to leftward and rightward motions during dancing etc., and therefore made a body motion smooth during exercise.

Comparative Example 4

A sports shirt was fabricated as in Example 5 except that a polyurethane mesh sheet was used instead of the high-resilience elastic thermoplastic elastomer (Y) in Example 5. Since the high-resilience elastic thermoplastic elastomer (Y) has a high 100% modulus, a feeling of tightening was strong, and the effect was inferior in terms of the ease of movement of the body during exercise.

Comparative Example 5

A sports shirt was fabricated as in Example 5 except that the thermoplastic elastomer (X) and the thermoplastic elastomer (Y) obtained in Comparative Example 2 were used in Example 5. Since the thermoplastic elastomer (X) has a low hysteresis loss rate, a feeling of fitting was weak, and the effect was inferior in terms of the wear comfort.

Comparative Examples 6 to 7

Sports shirts were fabricated as in Example 5 except that the thermoplastic elastomers (X) and the thermoplastic elastomers (Y) obtained in Comparative Examples 1 and 3 were used in Example 5. Since the high-resilience elastic thermoplastic elastomers (Y) have a high 100% modulus, a feeling of tightening was strong, and the effect was inferior in terms of the ease of movement of the body during exercise.

INDUSTRIAL APPLICABILITY

The structure according to the present invention is extremely useful in applications in which it is required to have a position where motion is desirably suppressed and a position where motion is desirably facilitated, for example, clothes such as sporting clothes (jackets, shirts, tights, pants, etc.), brassieres, sports brassieres, and corsets; supporters such as sports or therapeutic supporters, elbow or knee supporters, waist supporters, wristband supporters; socks such as sports socks; and footwear such as insoles of sports shoes.

Although the preferred embodiments of the present invention have been described above, various additions, modifications, or deletions are possible without departing from the spirit of the present invention, and such additions, modifications, or deletions also fall within the scope of the present invention.

EXPLANATIONS OF LETTERS OR NUMERALS 1 low-resilience elastic member
2 high-resilience elastic member
3 normal cloth

The invention claimed is:

1. A structure comprising: one or more low-resilience elastic members 1 made of a thermoplastic elastomer (X); and one or more high-resilience elastic members 2 made of a thermoplastic elastomer (Y), wherein the thermoplastic elastomer (X) and the thermoplastic elastomer (Y) are each independently made of a resin composition containing (a) 100 parts by mass of a hydrogenated block copolymer having a weight average molecular weight of 200,000 or less for 50 to 100 mass % and formed by hydrogenating a block copolymer composed of at least two polymer blocks A made up of structural units derived from a vinyl aromatic compound and at least one polymer block B made up of structural units derived from a conjugated diene compound, (b) 50 to 300 parts by mass of a hydrocarbon softener, and (c) 3 to 50 parts by mass of a polyolefin resin relative to a total of 100 parts by mass of (a) and (b), wherein the thermoplastic elastomer (X) has a modulus of 1.0 MPa or less at elongation of 100% and a hysteresis loss rate of 70% or more, and wherein the thermoplastic elastomer (Y) has a modulus of 1.0 MPa or less at elongation of 100% and a hysteresis loss rate of 40% or less.

2. The structure according to claim 1, wherein the one or more low-resilience elastic members 1 and the one or more high-resilience elastic members 2 are joined continuously or at predetermined positions on cloth.

3. The structure according to claim 2, wherein the low-resilience elastic members 1 and the high-resilience elastic members 2 are alternately joined.

4. The structure according to claim 2, wherein the low-resilience elastic members 1, the high-resilience elastic members 2, and the cloth are regularly or randomly joined.

5. The structure according to claim 1, wherein the low-resilience elastic member 1 and the high-resilience elastic member 2 form a multi-layer structure in which the members are laminated on cloth or laminated each other.

6. The structure according to claim 1, wherein the low-resilience elastic member 1 and the high-resilience elastic member 2 are laminated on cloth by bonding the members entirely or at points.

7. The structure according to claim 1, wherein the low-resilience elastic member 1 and the high-resilience elastic member 2 are each independently a film, a sheet, a tape, a woven fabric, a knitted fabric, a non-woven fabric, or a mesh body.

8. The structure according to claim 1, wherein the structure is clothes, a supporter, a sock, or footwear.

* * * * *